US005887460A

United States Patent [19]
Williams

[11] Patent Number: 5,887,460
[45] Date of Patent: Mar. 30, 1999

[54] PROPELLER SECURITY DEVICE

[76] Inventor: Terry L Williams, 8781 NW. 11th St., Pembroke Pines, Fla. 33024

[21] Appl. No.: 928,181

[22] Filed: Sep. 12, 1997

[51] Int. Cl.[6] .......... F16B 41/00
[52] U.S. Cl. .......... 70/18; 70/14; 70/58; 70/232
[58] Field of Search .......... 70/18, 53, 232, 70/14, 57, 58, 233, 158, 163, 166–169, 177, 178, 180; 416/62, 247 A

[56] References Cited

U.S. PATENT DOCUMENTS

| | | | |
|---|---|---|---|
| 1,308,458 | 7/1919 | Voight | 70/53 |
| 3,738,137 | 6/1973 | Jones | 70/53 |
| 3,759,076 | 9/1973 | Reese | 70/232 |
| 3,979,933 | 9/1976 | Mohrhoff | 70/53 |
| 4,257,247 | 3/1981 | Sims | 70/232 |
| 4,257,248 | 3/1981 | Williams | 70/18 |
| 4,324,119 | 4/1982 | Mitton | 70/232 |
| 4,502,306 | 3/1985 | Scammacca . | |
| 4,624,644 | 11/1986 | Hall . | |
| 4,715,783 | 12/1987 | Wade | 70/232 |
| 4,736,603 | 4/1988 | Brushaber . | |
| 4,760,719 | 8/1988 | Evans et al. . | |
| 4,920,772 | 5/1990 | Denison | 70/53 |
| 5,066,254 | 11/1991 | Bass et al. | 416/247 A |
| 5,176,550 | 1/1993 | Hooper | 416/247 A |
| 5,184,488 | 2/1993 | Sandlin | 70/232 |
| 5,392,621 | 2/1995 | Dunnigan . | |
| 5,417,093 | 5/1995 | Heiberg | 70/18 |
| 5,469,721 | 11/1995 | Pyle . | |
| 5,488,844 | 2/1996 | Winner | 70/18 |
| 5,613,386 | 3/1997 | Mire, Sr. | 70/18 |
| 5,778,706 | 7/1998 | Testa | 70/58 |

*Primary Examiner*—Darnell M. Boucher
*Attorney, Agent, or Firm*—Malin, Haley, DiMaggio & Crosby, PA

[57] ABSTRACT

A boat propeller lock for boat propellers of the type that include a central shaft with a plurality of outward extending propeller blades, and that attach to the drive shaft of an outboard or inboard/outboard marine motor is provided. In one embodiment, the invention includes a generally U-shaped member consisting of a base member and a pair of parallel arms. A generally C-shaped member having a pair of parallel arms extending perpendicular to the C-shaped member, with one arm extending from each end of the "C" of the C-shaped member. The U-shaped member being adapted so the base member fits the front portion of an outboard or inboard/outboard lower unit with the parallel arms facing aft of the lower unit, and the C-shaped member being positioned over the rear of the marine propeller with the parallel arms facing forward. The parallel arms of the U-shaped member being slidably engagable with the parallel arms of the C-shaped member. One of the members includes a locking portion that permits slidable engagement of the parallel arms, but prevents disengagement thereof unless the locking portion is unlocked. At least one of the parallel arms can include a plurality of longitudinally spaced ratchet teeth. The lock portion can include a pawl adapted to engage the rachet teeth to permit the U- and C-shaped members to be slid together while preventing the members from being pulled apart when in the locked position.

5 Claims, 2 Drawing Sheets

PROPELLER SECURITY DEVICE

BACKGROUND OF THE INVENTION

1. Field of the Invention

The invention relates to devices for preventing marine propellers attached to marine motors from being stolen when not in use. More particularly, the invention relates to devices that attach to the exterior of marine motors to lock the propeller to the motor preventing the unauthorized removal of the propeller.

2. Description of Related Art

Theft of boat propellers from marine motors when not in use is a problem for boat owners, marinas, insurance companies, and law enforcement authorities. The advanced design and materials of present day marine propellers creates a high value item that can be targeted for random and organized theft. Typically, propellers are bolted to marine outboard, or inboard/outboard, motor drive shafts and are left in place when the boat is not in use. When left unattended, the propellers can be removed simply by unbolting the propeller from the marine motor drive shaft.

As known in the art, inboard/outboard motors refer to the type of marine propulsion in which the marine motor is housed within the boat hull and the drive unit is positioned on the outer stern of the boat. The lower drive unit for the inboard/outboard motor is substantially the same as the lower drive unit from an outboard motor. The drive shaft in which the propeller is attached refers to the propeller drive shaft which located in the lower drive unit of the outboard and inboard/outboard motors.

What is needed is a quickly and easily installed lock that secures a marine propeller to the motor drive shaft to prevent unauthorized removal of the propeller. Because the lock should be in place protecting the propeller whenever the boat is not being used, the lock should have an attractive physical appearance. The lock should be easy to manufacture and low in cost.

SUMMARY OF THE INVENTION

The present invention provides a boat propeller lock for boat propellers of the type that include a central shaft with a plurality of outward extending propeller blades, and that attach to the propeller drive shaft of the lower drive unit of an outboard or inboard/outboard marine motor. In one embodiment, the invention includes a first, generally U-shaped, member consisting of a base member and a pair of parallel arms. A second, generally C-shaped member, having a pair of parallel arms extending perpendicular to the C-shaped member, with one arm extending from each end of the "C" of the C-shaped member.

The parallel arms of the U-shaped member being slidably engagable with the parallel arms of the C-shaped member. One of the members includes a locking portion that permits slidable engagement of the parallel arms, but prevents disengagement thereof unless the locking portion is unlocked.

In one embodiment, at least one of the parallel arms can include a plurality of longitudinally spaced ratchet teeth. The lock portion can include a pawl adapted to engage the rachet teeth to permit the U- and C-shaped members to be slid together while preventing the members from being pulled apart when in the locked position. The ratchet teeth can be covered by a longitudinally expandable flexible protective boot which expands over the teeth as the U- and C-shaped members are pulled apart.

The locking portion of the present invention can be unlocked by key or by combination-type tumbler settings. The locking portion of the present invention can be similar to the locking devices disclosed in U.S. Pat. No. 5,488,844, the disclosure of which is incorporated herein by reference.

In operation, the generally U-shaped member is placed around the front portion of the lower drive unit of an outboard or an inboard/outboard marine motor with the parallel arms facing toward the aft end of the lower unit. The U-shaped member is placed in front of the drive shaft with the parallel arms extending somewhat parallel to the drive shaft.

The generally C-shaped member is then placed circumferentially around the aft end of the shaft portion of an attached marine propeller behind the propeller blades, with the parallel arms of the C-shaped member facing forward and slidably engaging with the rear facing parallel arms of the U-shaped member.

The C-shaped member is sized such the C-shape is larger in circumference than the shaft portion of the propeller with the ends of the C-shape extending beyond a diameter of the shaft portion. The forward facing parallel arms extend around, thus capturing, at least two propeller blades to ensure that the invention cannot be removed without unlocking the locking portion. The U- and C-shaped members are slid together until the C-shaped member is snugly against the front edge of the at least two propeller blades. The U- and C-shaped members will not be removable unless the locking portion is unlocked.

Accordingly, it is an objective of the present invention to provide a marine propeller lock that is quickly and easily installed that securely locks the propeller to a marine motor drive shaft when not in use to prevent unauthorized removal of the propeller.

It is a further objective of the present invention to provide a marine propeller lock that has an attractive physical appearance, and that is easy to manufacture.

In accordance with these and other objects which will become apparent hereinafter, the instant invention will now be described with particular reference to the accompanying drawings.

DESCRIPTION OF THE PREFERRED EMBODIMENTS

The present invention will now be described in detail utilizing one embodiment for example.

Figure 1:
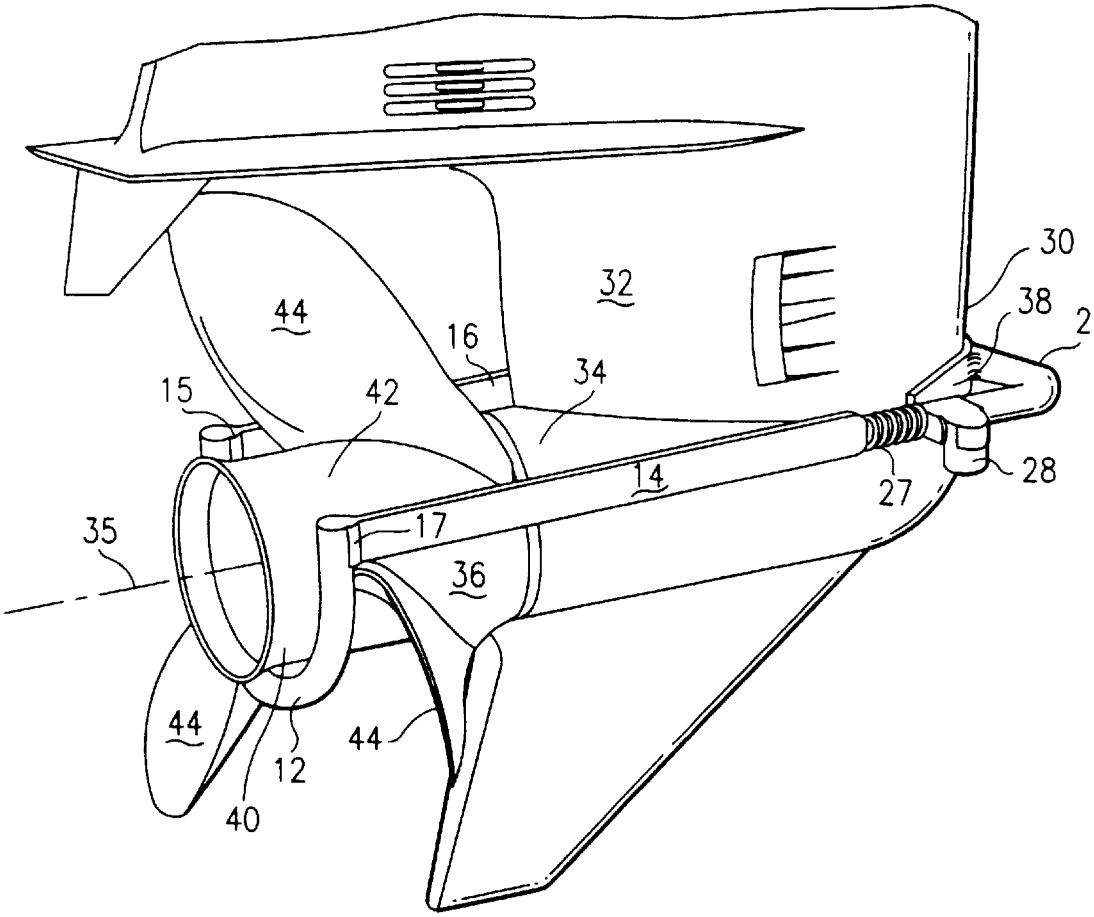
FIG. 1 is an exploded perspective view of the present invention.

Referring to FIG. 1, the present invention 10, includes a generally U-shaped member 2 having a base member 4, and a pair of parallel arms 6 and 8. A generally C-shaped member 12 includes a pair of parallel arms 14 and 16 which extend substantially perpendicular to the C-shaped member 12 from the ends 15 and 17 of C-shaped member 12.

The present invention 10 can be made of any material or combination of materials suitable for locks and which are difficult to break apart by unauthorized tampering. The materials are preferably metal, such as steel, case-hardened steel, aluminum, titanium, and alloys. Some of the components of the invention can be made of non-metallic composites. The base member 4 and pair of parallel arms 6 and 8 of generally U-shaped member 2 can be made of individual parts connected together in conventional manner, such as welded, or can be integrally constructed as one piece. The pair of parallel arms 14 and 16 can be connected to the generally C-shaped member 12 in conventional manner, such as welded near ends 15 and 17, or can be integrally constructed.

The parallel arms 6 and 8 of U-shaped member 2 are slidably engagable with the parallel arms 14 and 16 of the C-shaped member 12. The ends of arms 14 and 16, opposite the C-shaped member, can include shaft portions 18 and 20. Arms 6 and 8 can include bores 22 and 24 sized to receive shafts 18 and 20, respectively.

Shaft 18 can include a plurality of longitudinally spaced ratchet teeth 26. Teeth 26 can extend partially around shaft 18, or can extend fully circumferentially around shaft 18. Lock 28 can include a conventional pawl adapted to engage rachet teeth 26 to permit U-shaped member 2 and C-shaped member 12 to be slid together while preventing the members from being pulled apart when lock portion 26 is locked.

Lock 26 permits slidable engagement of shafts 18 and 20 into bores 22 and 24, but prevents disengagement thereof unless lock 26 is unlocked.

The ratchet teeth 26 can be covered by a longitudinally expandable flexible protective boot 27 which expands over the teeth 26 as U-shaped member 2 and C-shaped member 12 are pulled apart.

Lock 26 can be unlocked by key 29 or by combination-type tumbler settings, as known in the art. As discussed herein above, lock 26 can be similar to the locking devices disclosed in U.S. Pat. No. 5,488,844.

Figure 2:
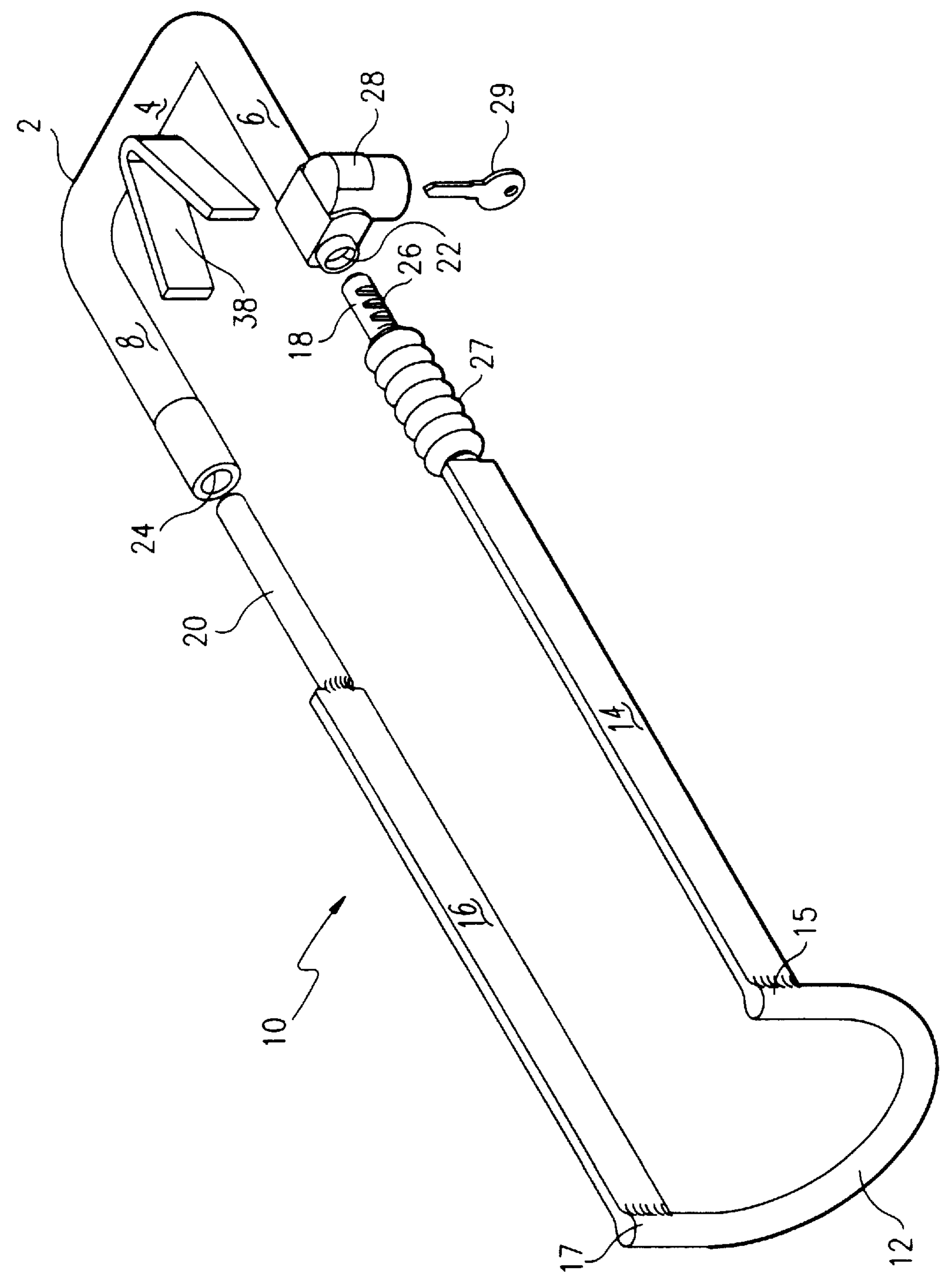
FIG. 2 is a perspective view of the present invention in use on a marine propeller and lower unit.

Referring to FIG. 2, the generally U-shaped member 2 is placed around the front portion 30 of the lower drive unit 32 of an outboard or an inboard/outboard marine motor with the parallel arms 6 and 8 facing toward the aft end 34 of lower unit 32. U-shaped member 2 is placed in front of the lower unit 32 with parallel arms 6 and 8 extending substantially parallel to the drive shaft of lower unit 32. The drive shaft is not shown in FIG. 3, but the location of the drive shaft is well known in the art and is illustrated by the center line 35 of propeller 36. Propeller 36 is removably attached to the drive shaft, as known in the art.

U-shaped member 2 includes V-bracket 38 which is sized to provide a secure and stable fit of member 2 against a plurality of front portions 30 of various sized lower units 32.

Generally C-shaped member 12 is then placed circumferentially around the aft end 40 of the shaft portion 42 of an attached marine propeller 36 behind the propeller blades 44, with the parallel arms 14 and 16 facing forward. Shafts 18 and 20 slidably engage with bores 22 and 24 of the rear facing parallel arms 6 and 8, respectively.

C-shaped member 12 is sized such the C-shape is larger in circumference than the shaft portion 42 of propeller 36 with ends 15 and 17 extending beyond a diameter of shaft portion 42. The forward facing parallel arms 14 and 16 thus extend around, or capture, at least two propeller blades 44 to ensure that the invention cannot be removed without unlocking lock 28. Members 12 and 2 are slid together until C-shaped member 12 is snugly against the aft edge of the at least two propeller blades 44. U-shaped member 2 and C-shaped member 12 will not be removable unless the lock 28 is unlocked.

Hence, with the present invention 10 in place, propeller 36 cannot be removed from lower unit 32 by unauthorized methods.

Propeller 36 is illustrated with three propeller blades 44, but can be a propeller having at least two and up to any number of blades 44. The invention 10 can be adapted to fit over a propeller 36 having any number of blades 44.

The exterior surface of the exposed portions of invention 10 can be coated with a plastisol layer to protect the finish of the lower unit 32 and the propeller 36 from marring, and to give invention 10 an attractive appearance.

The example provide herein above can include variations and modifications within the scope of the invention. For example, the ratchet teeth 26 can be utilized on either shaft 18 or 20, or both. The shafts 18 and 20 and bores 22 and 24 can be reversed such that member 2 would include shafts 18 and 20, and member 12 would include bores 22 and 24. Alternately one shaft and one bore could be included on each of members 2 and 12.

In addition, the U-shaped member 2 and C-shaped member 12 could be formed into alternate shapes. For example, member 2 could be C-shaped, and member 12 could be U-shaped. Member 12 could be D-shaped and member 2 could be V-shaped.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A lock for a marine propeller of the type having a central shaft and a plurality of outwardly extending propeller blades, the marine propeller being removably attachable to a lower drive unit of an outboard or inboard/outboard marine motor, comprising:

a generally U-shaped member having a first pair of substantially parallel arms, said generally U-shaped member attachable to a front portion of the lower drive unit and further including a V-shaped bracket adapted to closely fit the front portion of the lower drive unit, said first pair of substantially parallel arms extending aft along the lower drive unit when said generally U-shaped member is disposed on the lower drive unit;

a generally C-shaped member having a second pair of substantially parallel arms, each of said second pair of substantially parallel arms connected at a first end to opposing ends of said C-shaped member and extending substantially perpendicular to said C-shaped member, said generally C-shaped member attachable to the marine propeller and being adapted to extend more than one half a distance circumferentially around a rear portion of the central shaft of the marine propeller, said second pair of substantially parallel arms extending forward along the lower drive unit and capturing at least two of the outwardly extending propeller blades when said generally C-shaped member is disposed on the marine propeller;

said first pair of parallel arms and said second set of parallel arms being slidably engagable wherein said generally U-shaped member and said generally C-shaped member being substantially perpendicular to each other; and, releasable means for preventing said U-shaped and said C-shaped members from being separated apart after slidable engagement of said first and said second pair of parallel arms.

2. A The lock of claim 1 wherein said second pair of substantially parallel arms each include a shaft portion on a second end, said first pair of substantially parallel arms each include a central bore sized to receive one each of said shaft portions.

3. The lock of claim 2 wherein said releasable means for locking includes at least one of said shaft portions having a plurality of longitudinally spaced rachet teeth, each of said plurality of rachet teeth extending at least partially circumferentially about said shaft.

4. The lock of claim 3 further including a lock connected at least partially within at least one of said central bores, said lock being movable from a locked position for engaging with at least one of said plurality of rachet teeth when said shaft portion is slidably received into said bore and preventing movement of said shaft portion back out of said bore, and a second released position for releasing engagement of said plurality of rachet teeth for movement of said shaft portion out of said central bore.

5. A lock for a marine propeller of the type having a central shaft and a plurality of outwardly extending propeller blades, the marine propeller being removably attachable to a lower drive unit of an outboard or inboard/outboard marine motor, comprising:

a generally U-shaped member having a first pair of substantially parallel arms attachable to the lower drive unit, each arm having a central bore, said generally U-shaped member having a V-shaped bracket adapted to fit a front portion of the lower drive unit with said first pair of substantially parallel arms extending aft along the lower drive unit when said generally U-shaped member is disposed on the lower drive unit;

a generally C-shaped member having a second pair of substantially parallel arms, each of said second pair of substantially parallel arms connected at a first end to opposing ends of said C-shaped member and extending substantially perpendicular to said C-shaped member, and each of said second pair of substantially parallel arms include at least a portion forming a shaft on a second end;

said first pair of parallel arms and said second set of parallel arms being slidably engagable wherein each of said shaft portions being receivable into one of said central bores, said generally U-shaped member and said generally C-shaped member being substantially perpendicular to each other;

said generally C-shaped member attachable to the marine propeller and adapted to circumscribe at least over one half of the perimeter of an aft end of the central shaft of the marine propeller with said second pair of parallel arms extending forward along the lower drive unit and over at least two of the plurality of outwardly extending propeller blades when said generally C-shaped member is disposed on the marine propeller; and, releasable means for preventing said U-shaped and said C-shaped members from being separated apart after slidable engagement of said first and said second pair of parallel arms.

* * * * *